United States Patent [19]
Vanasse et al.

[11] Patent Number: 5,673,644
[45] Date of Patent: Oct. 7, 1997

[54] TRI-JOINT COUPLING

[75] Inventors: Robert D. Vanasse, Columbia; Roger P. Norris, Mystic; Roger H. Geer, Jewett, all of Conn.

[73] Assignee: The United States of America as represented by the Secretary of the Navy, Washington, D.C.

[21] Appl. No.: 701,321

[22] Filed: Aug. 22, 1996

[51] Int. Cl.⁶ .................................................. B63B 21/66
[52] U.S. Cl. .................. 114/242; 114/244; 114/249; 114/253
[58] Field of Search .................... 114/242, 244, 114/249, 253; 439/540.1, 701; 367/20, 106, 130, 154, 165, 177

[56] References Cited

U.S. PATENT DOCUMENTS

| | | | |
|---|---|---|---|
| 2,979,015 | 4/1961 | Estes | 367/130 |
| 5,447,453 | 9/1995 | Smith et al. | 439/701 |

Primary Examiner—Sherman Basinger
Attorney, Agent, or Firm—Michael J. McGowan; James M. Kasischke; Prithvi C. Lall

[57] ABSTRACT

A tri-joint coupling for enabling the streaming and retrieving of a towed array system having a single towcable and multiple towed array lines without disconnecting the lines from the towcable. The system is capable of being used on state-of-the-art inboard submarine handling systems. The tri-joint coupling is circular in cross-section at the single towcable end and elliptical in cross-section at the multiple towed array line end. The elliptical end of the coupling has three coupling inserts that are circular in cross-section and have electrical/optical connectors that connect individual electrical/optical conductors on the cable side to individual electrical/optical conductors on the multiple array side.

6 Claims, 4 Drawing Sheets

TRI-JOINT COUPLING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to a coupling used in a towed array system. The coupling effectively streams and retrieves from an inboard submarine handling system multiple towed array lines from a single towcable.

(2) Description of the Prior Art

Some prior art systems use rigid faired struts to separate the arrays to a predetermined aperture or spacing. Another prior art system utilizes a large underwater tow body where the array lines are attached to its horizontal and vertical stabilizers.

The limitations on the above designs are two-fold. First, neither type system can be reeled or stowed on any handling system. The arrays must be physically detached from the towed body before they can be retrieved. The strut is a rigid hydrodynamic structure about fifteen feet long, making it impractical for handling system use. Second, and most important, these previous designs have active control surfaces that have been known to malfunction causing the array lines to wrap around each other and in some instances causing damage to the arrays.

SUMMARY OF THE INVENTION

Accordingly, it is a general purpose and object of the present invention to provide a coupling for use in a towed array system. It is a further object that the coupling permits multiple arrays to connect to a single towline.

Another object is that the coupling does not inhibit the towed array system, that it is a part of, from being reeled and stowed on a ship's handling system.

Further objects are that the coupling carry all tensile loads due to drag and houses state-of-the-art underwater electrical and optical connectors.

These objects are accomplished with the present invention by providing a compact tri-joint electrical/optical coupling with one end suitable for connecting to a tow cable and the other end housing three coupling inserts having connectors suitable for connecting to line arrays. The tri-joint coupling has an elliptical cavity to maintain a flat profile when stored on the handling system, thus preventing array damage.

The tri-joint coupling permits multiple towed arrays to be streamed and retrieved from an inboard or outboard submarine handling system using a single fiber optic coaxial towcable. The tri-joint coupling is short in length to prevent damage to array lines during retrieval on a stowage drum. Titanium was used to give it a high strength to weight ratio, thereby maintaining buoyancy and system tensile strength. It is small enough to pass through the bellmouth with modification of the guide tube in the horizontal stabilizer of all classes of United States submarines.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
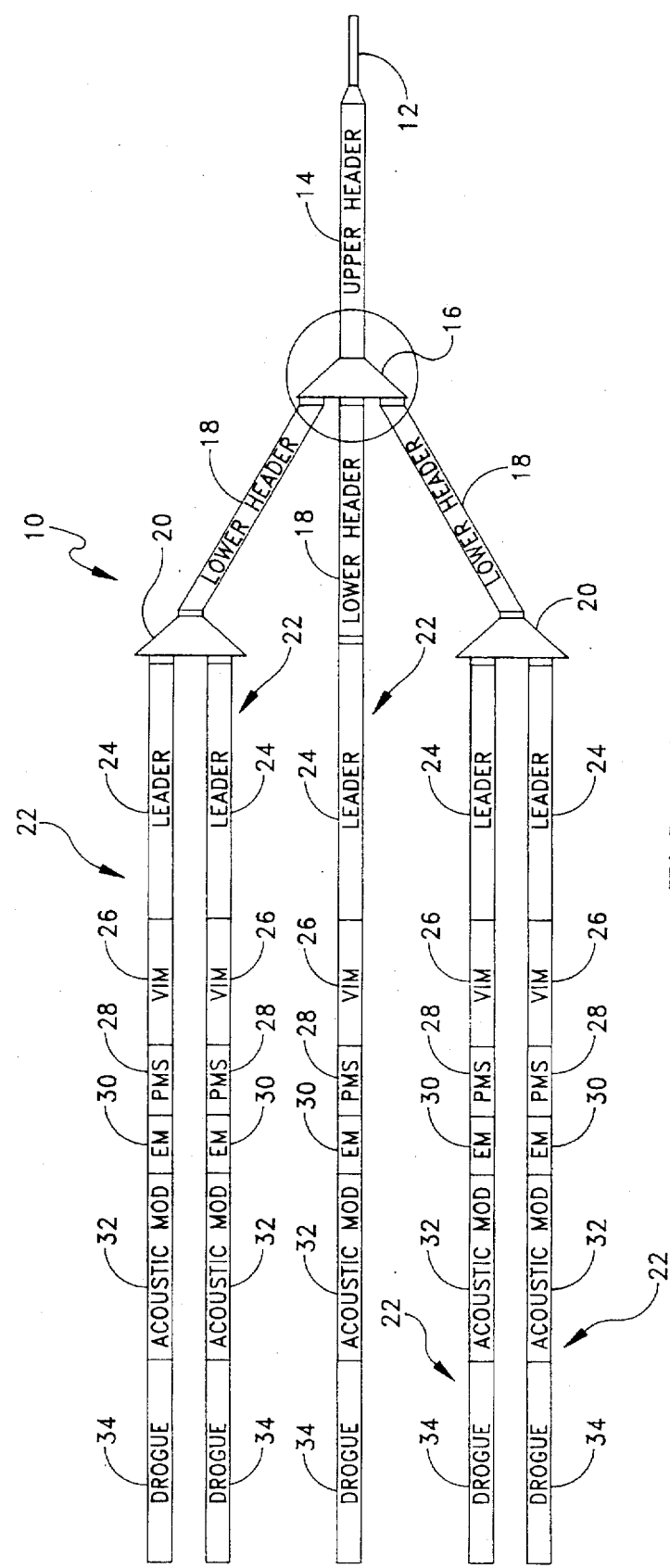
FIG. 1 is a diagram of a towed array system suitable for utilizing the tri-joint electrical/optical coupling of the present invention.

Referring now to FIG. 1 there is shown a diagrammatic sketch of a towed array 5-line configuration 10 that streams from a submarine or surface ship (neither shown). A tow cable 12 has an upper header 14 connected to one end of the tri-joint electrical/optical coupling 16. The other end of the coupling 16 is connected to three lower headers 18. Two of the lower headers 18 connect to y-joints 20. Each y-joint has two of the five line arrays 22 attached to it. The other array 22 connects to the remaining lower header 18. Each of the five line arrays comprise a leader 24, vibration isolation module 26, PMS 28, electronics module 30, acoustic module 32, and drogue 34.

Figure 2:
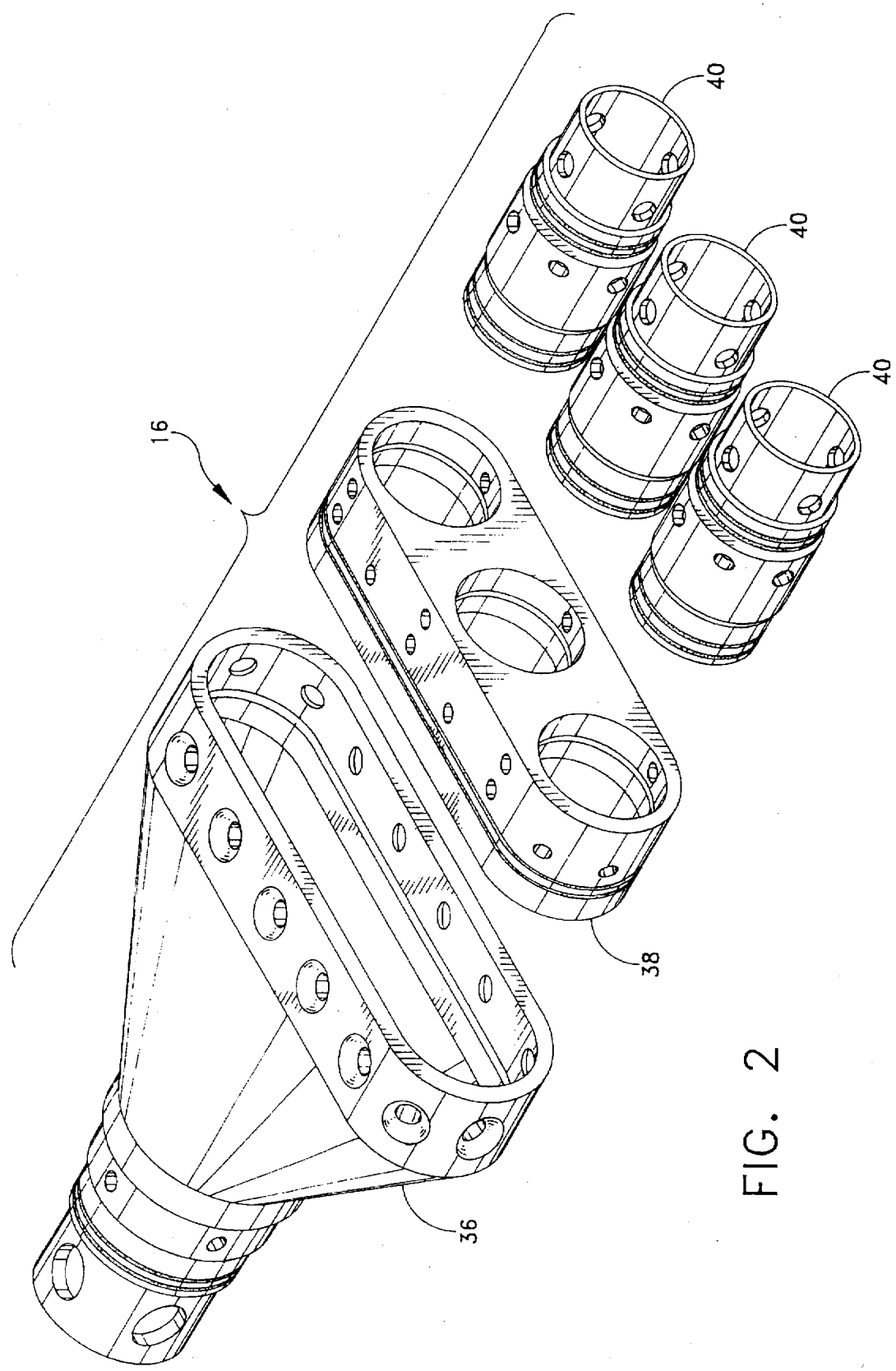
FIG. 2 is an exploded view of the tri-joint electrical/optical coupling represented in FIG. 1.

Referring now to FIG. 2 there is shown an exploded view of the tri-joint electrical/optical coupling 16. The tri-joint coupling 16 has for its major components a tri-joint body 36, a tri-joint cap 38, and three tri-joint aft coupling inserts 40 that are approximately 1.5 inches in diameter. This dimension is given only to give the reader a feel for the size of the components in the tri-joint coupling 16.

Figure 3:
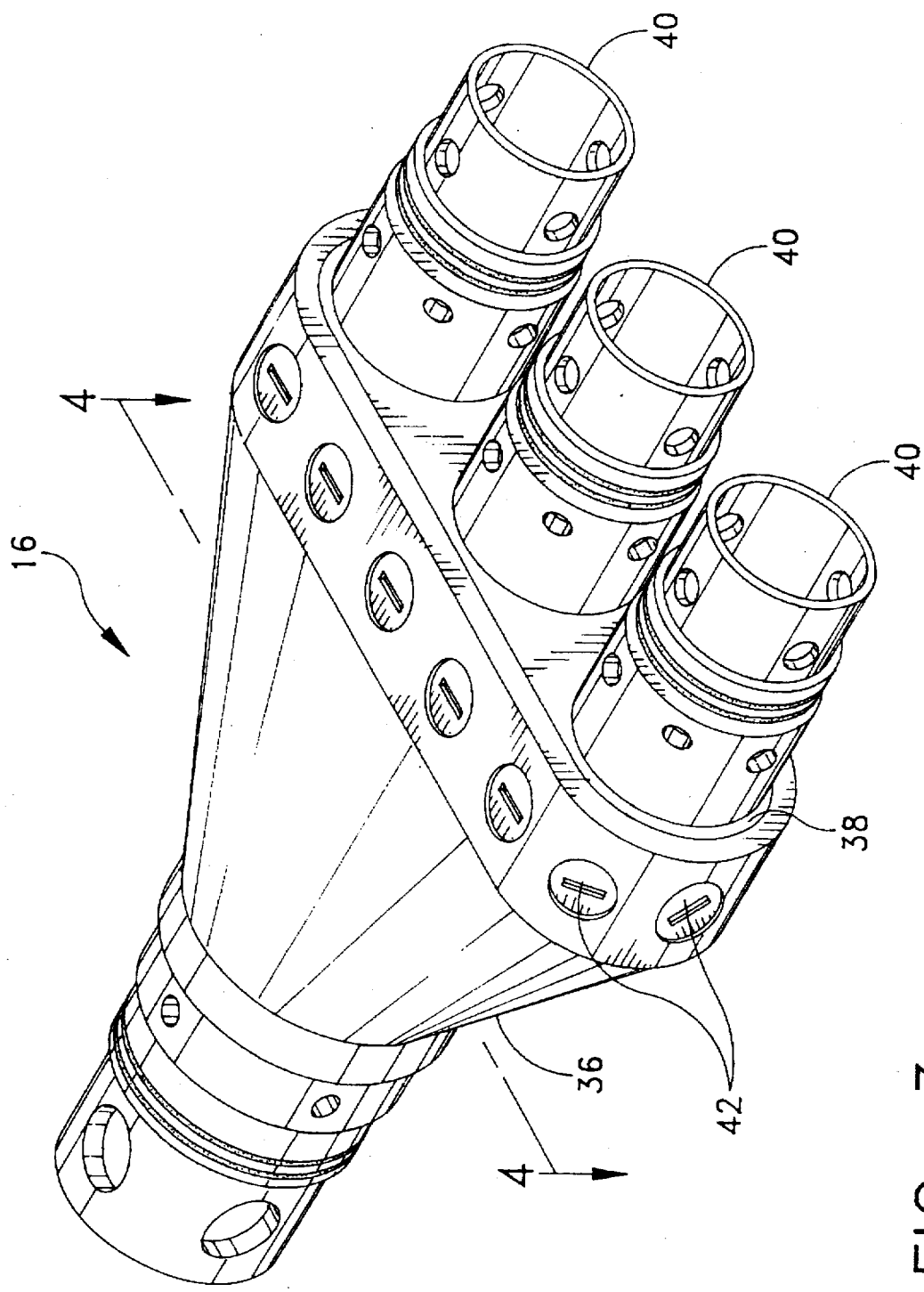
FIG. 3 is an assembled view of the tri-joint electrical/optical coupling of FIGS. 1 and 2.

Referring now to FIG. 3 there is shown the assembled version of the tri-joint coupling 16 of FIG. 1. All the components of FIG. 2 are shown and in addition several screws 42 attaching tri-joint body 36 to tri-joint cap 38 are shown.

Figure 4:
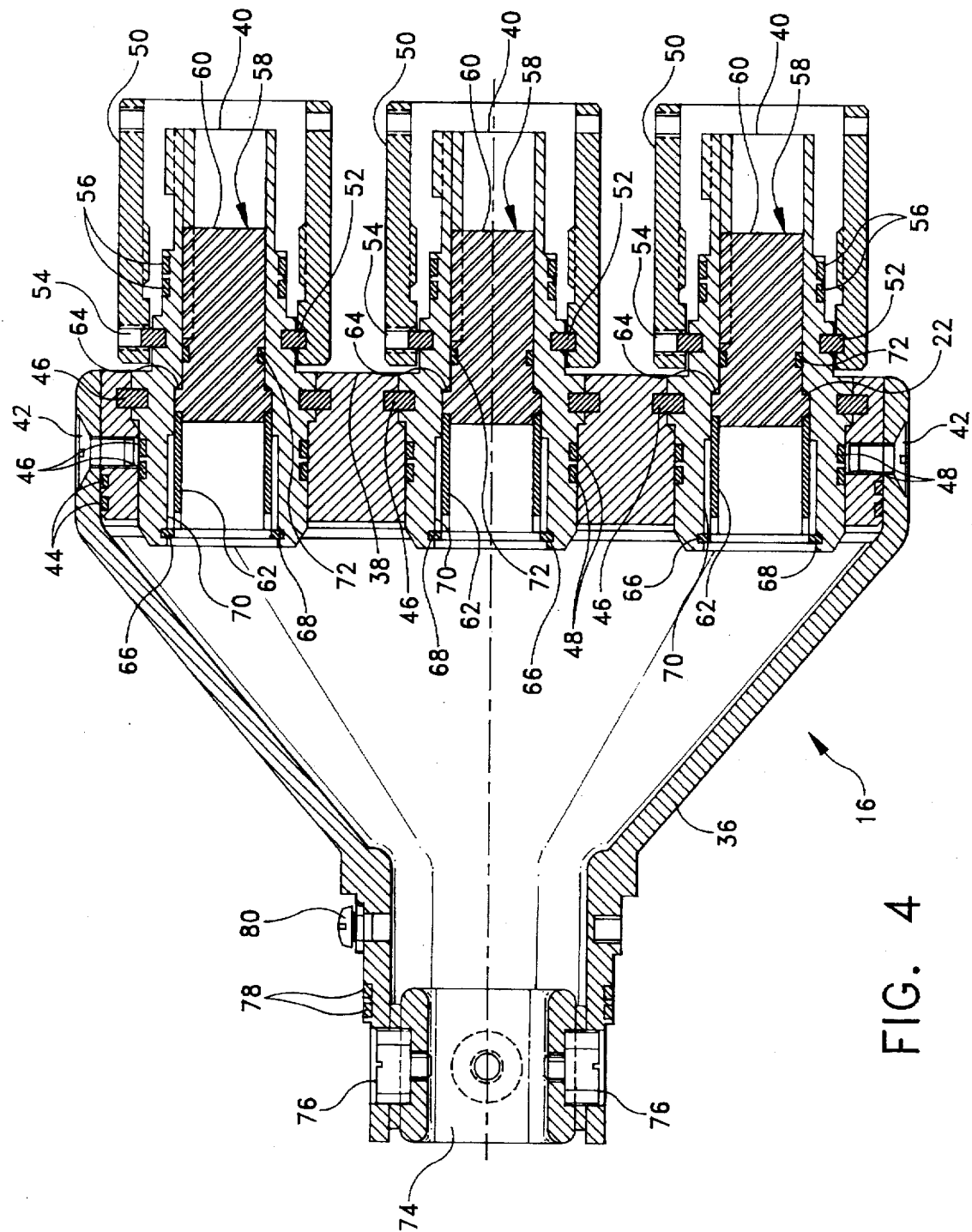
FIG. 4 is a cross-sectional view of the tri-joint electrical/optical coupling of FIGS. 1-3 with coupling nuts added.

Refer now to FIG. 4 for a more detailed explanation of the device. FIG. 4 shows a cross-sectional view of the tri-joint coupling 16. As mentioned earlier the tri-joint coupling 16 has a housing piece called the tri-joint body 36 that is secured to the tri-joint cap 38 by means of screws 42. O-ring seals 44 maintain watertight integrity between the elliptical tri-joint body 36 and cap 38. Tri-joint coupling keys 46 attach the three coupling inserts 40 to the tri-joint cap 38 and O-rings 48 maintain a hydrostatic seal between the components.

Coupling nuts 50 are attached to coupling inserts 40 by means of coupling keys 52 and set screws 54. A function of the coupling nuts 50 is to attach to a thin line array coupling (not shown). O-rings 56 are for forming a seal between the coupling inserts 40 and the thin line array coupling.

The coupling inserts 40 hold plug inserts 58 that have electrical/optical connectors 60. The plug inserts 58 have a potting shell 62 for holding polyurethane to provide a strain relief for both electrical and optical conductors (not shown). Each plug insert 58 is held in place in relation to one of the coupling inserts 40 by shoulders 64 and at the potting shell end 62 of the plug insert 58 by means of a retaining ring 66 that fits in a groove 68 in the inner cylindrical wall 70 of coupling insert piece 40. A hydrostatic seal is maintained between each plug insert 58 and the inner cylindrical wall 70 of each coupling insert piece 40 by means of an O-ring 72.

The other end of the tri-joint body 36 has an upper header strength member termination knob 74. A composite upper header strength member (not shown) attaches to this termination knob 74. A plurality of upper header strength member termination screws 76 are shown that attach termination knob 74 to tri-joint body 36.

O-rings 78 provide a seal between tri-joint body 36 and the hose termination of the upper header (not shown). A threaded check valve 80 is shown for inserting non-conducting oil at a slight pressure above sea water (approximately two to three pounds).

There has therefore been described a tri-joint electrical/optical coupling for use in line arrays. Although the device was specifically designed for use in United States submarines it can be used with other water vehicles. It eliminates the problems encountered with prior art devices used in line arrays by permitting the arrays to be reeled and stowed by state-of-the-art handling systems without first detaching the line arrays from the rest of the system. It addition the tri-joint electrical/optical coupling has no active control surfaces, as in previous devices, that can malfunction and cause the array lines to wrap around each other.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A tri-joint coupling for use in a towed array system comprising:

a body having a circular aperture at one end and an elliptical aperture at the other end;

a tri-joint cap having an elliptically shaped outer surface inserted into said elliptical aperture of said of said body and affixed to said body, said tri-joint cap having a plurality of aligned spaced cylindrical apertures centered on the major axis of said elliptically shaped outer surface; and a plurality of tri-joint coupling inserts with each of said plurality of tri-joint coupling inserts inserted into one of said tri-joint cap's plurality of aligned spaced cylindrical apertures and each of said plurality of tri-joint coupling inserts held in place abutting said tri-joint cap.

2. A tri-joint coupling for use in a towed array system according to claim 1 further comprising:

a plurality of machine screws connecting said body to said tri-joint cap; and a hydrostatic seal placed between said body and said tri-joint cap.

3. A tri-joint coupling for use in a towed array system according to claim 2 further comprising:

a tri-joint coupling key placed between said tri-joint cap and each of said tri-joint coupling inserts; and a hydrostatic seal placed between said tri-joint cap and each of said tri-joint coupling inserts.

4. A tri-joint coupling for use in a towed array system according to claim 3 further comprising:

a plurality of coupling nuts with each coupling nut axially aligned and placed over a respective member of said tri-joint coupling inserts; and a set screw and coupling key connecting each of said plurality of coupling nuts to said respective member of said tri-joint coupling inserts.

5. A tri-joint coupling for use in a towed array system according to claim 4 wherein said body further comprises:

an upper header strength member termination knob inserted into and affixed to said one end having said circular aperture;

O-rings located on the outer portion of said one end having said circular aperture; and a threaded check valve located at said one end having said circular aperture.

6. A tri-joint coupling for use in a towed array system according to claim 5 wherein each of said tri-joint coupling inserts further comprises:

a housing having a cylindrically shaped aperture;

a plug inserted in said cylindrically shaped aperture said plug having a connector and a potting shell;

a retaining ring holding said plug in said housing; and an O-ring maintaining a hydrostatic seal between said plug and said housing.

* * * * *